United States Patent [19]

Greene

[11] 4,243,274

[45] Jan. 6, 1981

[54] HYDRODYNAMIC BEARING WITH RADIAL, THRUST AND MOMENT LOAD CAPACITY

[76] Inventor: Jerome Greene, 1241 Barclay Ct., Westlake Village, Calif. 91361

[21] Appl. No.: 937,594

[22] Filed: Aug. 28, 1978

Related U.S. Application Data

[63] Continuation of Ser. No. 757,324, Jan. 6, 1977, abandoned.

[51] Int. Cl.³ .......................... F16C 7/04; F16C 17/06; F16C 27/06
[52] U.S. Cl. .......................................... 308/9; 308/26; 308/73; 308/135; 308/160
[58] Field of Search ................... 308/9, 35, 26, 28, 29, 308/72, 73, 121, 160, 161, 162, 135, 168

[56] References Cited

U.S. PATENT DOCUMENTS

| | | | |
|---|---|---|---|
| 2,137,487 | 11/1938 | Hall | 308/73 |
| 2,498,011 | 2/1950 | Sherbondy | 308/73 |
| 3,131,004 | 4/1964 | Sternlicht | 308/73 |
| 3,578,828 | 5/1971 | Orkin et al. | 308/135 |
| 3,679,197 | 7/1972 | Schmidt | 308/26 |

Primary Examiner—Charles E. Frankfort
Attorney, Agent, or Firm—Bacon & Thomas

[57] ABSTRACT

A hydrodynamic bearing capable of transmitting radial, thrust and moment loads between an inner load applying or supporting member rotatably connected to the bearing utilizes at least a pair of cylindrical groups of bearing pads disposed about a longitudinal axis of rotation, the pads having movable face portions with compound curved bearing surfaces symmetrically disposed about and along the longitudinal axis, the curved surfaces mating with similar curved bearing surfaces on a load applying or supporting member. The face portions of the bearing pads are supported so that they are swingable about "swing points" located between the axis of rotation of the bearing and the face portions thereof under the combined influences of friction and load forces exerted thereagainst by the load applying or supporting member, so that through hydrodynamic action wedge-shaped lubricant films are generated between the relatively moving bearing surfaces to maintain the surfaces apart while the motion is occurring. Radial, and thrust and moment loads between the load applying or supporting member and the bearing pads are all effectively transmitted by the bearing by reason of the particular relationship between the bearing surfaces, without adversely affecting the hydrodynamic action of the bearing.

10 Claims, 5 Drawing Figures

HYDRODYNAMIC BEARING WITH RADIAL, THRUST AND MOMENT LOAD CAPACITY

BACKGROUND OF THE INVENTION

This invention relates to the field of rotating fluid film (hydrodynamic) bearings and provides a solution to problems inherent in prior art bearings that use compound curved bearing surfaces supporting radial, thrust and moment loads. The present invention utilizes the principle of operation of the SWING-PAD BEARING described in U.S. Pat. No. 3,930,691 issued Jan. 6, 1976, in a bearing assembly using compound curved bearing surfaces to carry radial, thrust and moment loads.

In essence, that patent discloses a hydrodynamic bearing pad including a movable face portion that is adjacent to a relatively movable load applying or supporting surface in the presence of a lubricant, the face portion of the bearing pad being mounted for swinging motion relative to a base element underlying the surface portion about a swinging axis or center located toward the relatively movable load applying or supporting surface and away from the face portion of the bearing pad to enable generation of the lubricant wedge. Motion of the moveable base portion of the pad relative to the load applying or supporting surface under operational conditions, as described in that patent, causes the pad face portion to swing in minute amounts to an inclined position relative to the load applying or supporting surface under the combined influences of load and friction forces to produce a wedge-shaped gap that converges in the direction of motion of the load applying or supporting surface relative to the face portion of the pad. Multiple such bearing pads are normally provided in a typical bearing installation for supporting a relatively moving load applying or supporting member. Lubricant drawn into the multiple gaps as a result of relative motion between the bearing surfaces and hydrodynamic action maintains the face portions of the pads and the adjacent relatively moving surface out of contact with each other instantaneously upon onset of relative motion, and during the operation of the bearing.

The shape of the lubricant wedge associated with each bearing pad self-adjusts during operation of the bearing under varying load and speed conditions due to its unique design. Specifically, the face portion of each pad is joined to an underlying base element along an arcuate interface having a center of curvature located substantially at the desired center of swinging motion of the face portion. A curved, laminated, elastomer-nonelastomeric material is disposed between the face portion and the underlying base element of each pad, and is bonded on each side to both elements. The laminate material is compliant in the shear direction (parallel to the arcuate interface between the face portion and the underlying base element) but is essentially rigid in a radial sense (perpendicular to the arcuate interface). Therefore, the face portion of each bearing pad can readily and is actually forced to swing to a slightly inclined position about the center or axis of swing under the influence of friction and load forces applied to its surface by the load supporting member while still maintaining its basic position in the bearing assembly.

My earlier patent referenced above discloses radial and thrust bearing embodiments utilizing the swing pad concept. However, the present invention is intended to utilize the same principle in a combined radial and thrust bearing that utilizes compound curved bearing surfaces, the swing pad bearing overcoming problems encountered in the prior art in situations where it is desired to use such a bearing for supporting high radial loads.

More specifically, it is well known that the rotary part of plain journal radial bearings with lubricated continuous sliding surfaces actually runs slightly eccentric with respect to the longitudinal axis of the bearing, and this eccentricity permits the generation of a wedge of lubricant between the relatively moving bearing surfaces. The wedge of lubricant, through pressures generated by hydrodynamic action, in turn keeps the bearing surfaces apart so that surface-to-surface contact is avoided and frictional resistance to motion is minimized.

In situations where a sliding bearing having both radial and thrust capacity is desired, it has been proposed to use compound curved surfaces of various forms (e.g., a ball in a socket). The problem here is that the compound curvature of the continuous bearing surfaces tends to prevent the moving element of the bearing from assuming its eccentric loaded rotating position at which the lubricant wedge is formed when the bearing is loaded in a thrust sense. The thrust bearing surface, being uniformly curved about the rotational axis, tends to hold the rotating element at the center of the bearing and therefore a radial load supporting lubricant wedge can not be developed by the bearing because hydrodynamic pressures are not generated in the lubricant film to the extent necessary to keep the bearing surfaces apart.

A hydrodynamic tilting pad arrangement could be envisioned for such an application, but the required compound curvature of the bearing surface of the tilting pad, along with the variable nature of the radial and thrust loads, results in the position of the center of pressure acting on the tilting pad elements to be unpredictable. Since the center of pressure in a tilting pad bearing arrangement must be virtually in line with the tilt pivot point to prevent instability of the tilting segment of the bearing, clearly a tilting pad bearing had deficiencies which limit its application in a bearing of the type presently under consideration.

SUMMARY OF THE INVENTION

The present invention utilizes the swing pad bearing concept as disclosed in the previous U.S. patent referenced above, in a bearing assembly designed to handle radial, thrust and moment loads.

According to the present invention, the fact that the swing pad bearing surfaces need no specific fixed relationship between their centers of pressure and their centers of swing location results in their being especially suited for application in a combined radial and thrust bearing, when the bearing surfaces have a compound curvature. Using the swing pad bearing concept, any combination of radial and thrust loading applied to the bearing pads by a moving surface results in the generation of a load supporting lubricant wedge. The pad position changes automatically to maintain pad stability, the position depending upon the relative values of the friction and load forces, and their relative directions of applications.

Specifically, two groups of swing pad bearings are cylindrically positioned about the longitudinal axis of a load applying or supporting member, the pads of each set having compound curved surfaces that are adjacent to similarly curved surfaces on the load applying or supporting member. The bearing pad surfaces of each group of bearings have curvatures that are symmetrical about the longitudinal axis (between spherical and conical) and are inclined relative to the longitudinal axis in opposite directions, so that radial, thrust and moment loads can be carried by the bearing pad assembly. The movable bearing face elements will always move about their respective swing points because of the construction of the bearing pads so that dynamically stable and balance fluid lubricant wedges are formed between the relatively moving bearing surfaces, irrespective of thrust and radial loads acting on the bearing. Friction forces caused by moving radial loads cause the bearing pad surfaces to swing about their swing points in directions parallel to the direction of motion of the adjacent bearing surface of the load applying or supporting member, while thrust loads cause the movable bearing face elements to swing back towards the source of the thrust load so that the fluid film pressures between the moving surfaces are in balance. Most importantly, thrust loads do not disturb the ability of the bearing to generate the desired lubricant wedges.

DETAILED DESCRIPTION OF THE INVENTION

DESCRIPTION OF THE INVENTION

Figure 1:
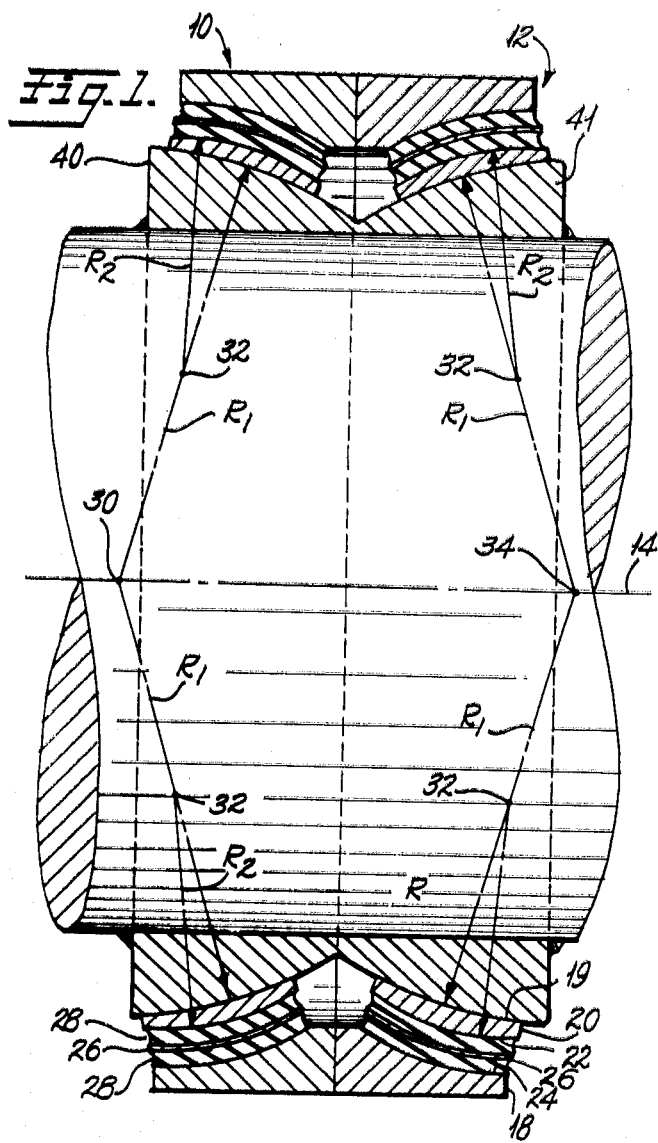
FIG. 1 is a diagrammatic elevational view of a combined radial, thrust and moment load carrying bearing embodying my invention.
Figure 2:
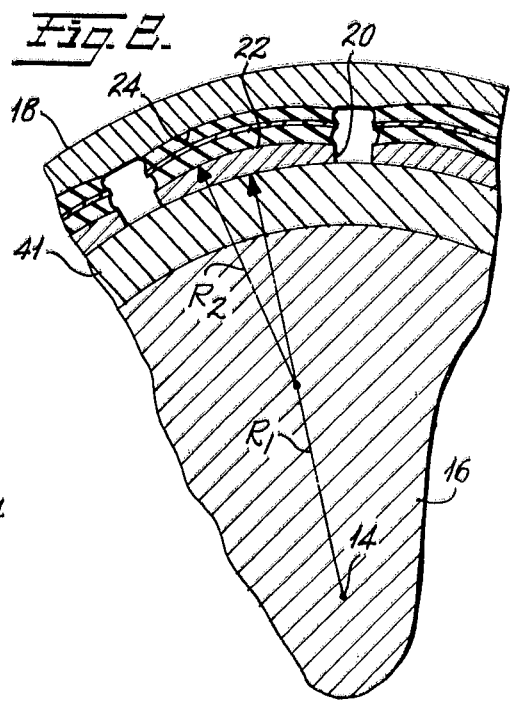
FIG. 2 is a partial end view of the bearing of FIG. 1.

With reference to FIGS. 1 and 2, the bearing embodying a presently preferred mode of construction comprises two cylindrically arranged groups of bearing pads 10 and 12 disposed about a longitudinal axis 14 between a load applying or supporting member 16 and an outer member 18, the latter comprising a series of connected base elements for the bearing pads shown. All the base elements are fixed relative to each other and the fixed bearing housing structure (not illustrated).

The pads 10 and 12 each comprise a movable face portion 20 connected to its respective section of base 18 through spherically arcuate interface surfaces 2, 24. A metal-elastomer laminate material 26, 28 is preferably bonded on opposite sides to both interface surfaces 22, 24, the layers 26, 28 being soft in shear (parallel to surfaces 22, 24) but rigid in a radial compressive direction (normal to surfaces 22, 24). Layers 28 preferably are made of rubber and layers 26 of metal.

The bearing surfaces 19 of the movable face portions 20 of each bearing group 20 are spherical, and their centers of curvature are located at a common point 30 on longitudinal axis 14. The center of curvature of interface surfaces 22, 24 are located at swing centers or points 32 on radii $R_1$, extending from axis 14 to the surface 19 of each pad, preferably the at-rest center point of each surface 19. The layers 28 of elastomer inherently elastically cause face portions 20 to be biased towards their at-rest positions. The swing point 32 is always located between the axis 14 and the surfaces 19, preferably approximately mid-way along radii $R_1$, so that, for example, the interface surface 22 underlying each face portion 20 is always curved about a radius $R_2$ that is shorter than radius $R_1$. The laminate layers 26, 28 are likewise curved parallel to interface surfaces 22 and 24. The points 32 of the pads are preferably equidistant from axis 14. The spherically arced interface underlying the face portions 20 enables the latter to move in a swinging motion about the respective centers of swing of each pad (points 32) when they are subjected to displacing forces acting along the vectors that do not pass through the swing point 32 such displacing forces result from friction and load influences acting on the movable face portions of the bearing pads.

The second group of bearing pads 12, here shown in back-to-back relationship with bearing pad set 10, is constructed similarly to pad set 10, only the pad face portions are oriented about axis 14 so that their surfaces have a common center of curvature 34 axially spaced along axis 14 from point 30, with the radii $R_1$ of each bearing pad set converging towards each other; that is, radii $R_1$ of bearing pad set 10 converge towards the radii $R_1$ of bearing set 12. Otherwise, the relationships between points 34, 32, $R_1$ and $R_2$ are identical for both bearing pad sets 10 and 12. Thus, the bearing surfaces 10 of each group are inclined relative to axis 14 so that they face away from each other, and the support 18 of each group are fixed relative to the other group.

A load applying or supporting member 16 extends generally along axis 14 and is rotatable relative to the bearing pads. A pair of spherically curved segments 40, 41 are fixedly joined to member 16, the segments 40, 41 having sliding bearing surfaces in sliding relationship with respect to curved bearing pad surfaces 29. The surfaces of the segments 40, 41 correspond in curvature to the bearing pad surfaces 29 (having curvatures about axis 14 that are between conical and spherical).

Figure 3:
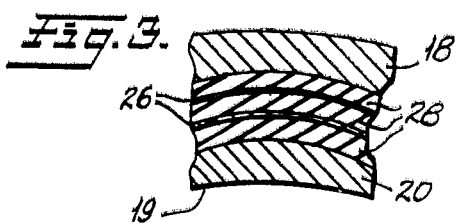
FIG. 3 is a detail view of an alternate laminate construction.

In FIG. 3, there is illustrated the use of a slightly modified lamination 26, 28 to show that multiple curved metal layers 26 may be provided, and to show the bearing pads in closer detail.

Figure 4:
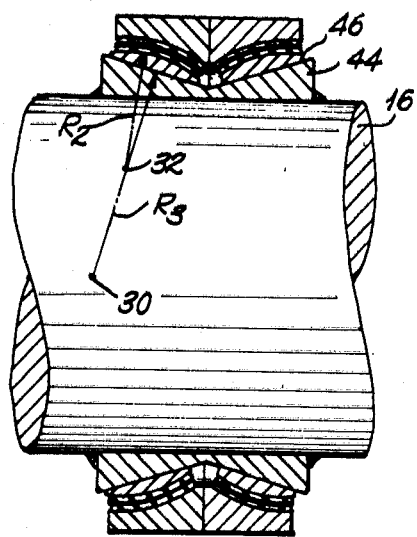
FIG. 4 shows an alternate embodiment of the invention illustrated in FIG. 1.

In FIG. 4, the member 16 is provided with a pair of conical curved elements 42, 44 that cooperate in sliding relationship with conical curved surfaces of movable pad faces 46 that are swingable about swing points 32. Radius $R_2$ in FIG. 4 corresponds with radius $R_2$ in FIG. 1. The dimension $R_3$ is one radius that extends perpendicular to the conical surfaces of the face portions 46 from substantially the centers thereof and they intersect a common point 30 on axis 14. Preferably, point 32 would be located on such a radius.

Figure 5:
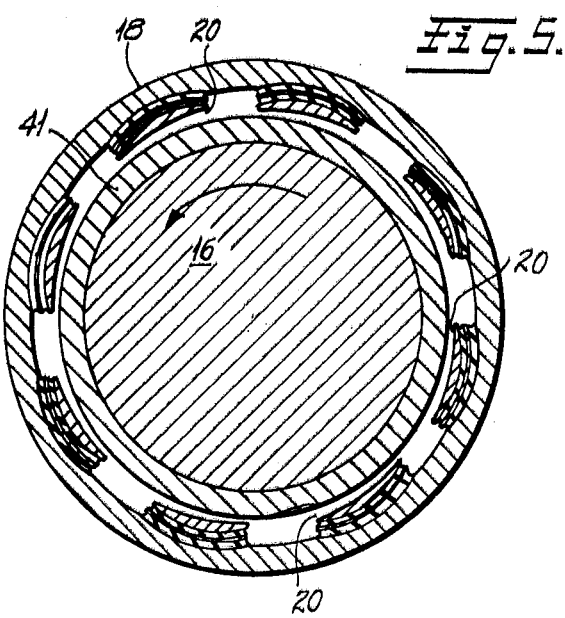
FIG. 5 shows the principle of operation of the swing pad elements.

In FIG. 5, the principle of operation of the invention is illustrated in a radial and rotational sense, the various dimensions of laminated thickness and lubricant gap thickness being exaggerated for clarity. Rotation of member 16 in the direction of the arrow creates friction forces on the surface 29 of face portions 20 of the bearing pads 10 and 12, causing them to each swing towards the direction of motion of the surface of member 41 relative to surface 19 of the bearing pads. The swinging action creates a wedge-shaped gap between each face portion and member 16 that tapers in the direction of swinging motion into which lubricant, in which the bearing pads are immersed, is drawn by the viscous forces between the lubricant and the moving surface. A lubricant wedge is thus generated between the moving bearing surfaces that keeps them apart and permits relative motion between the parts with extremely low coefficients of friction. The radial and thrust loads of the bearing acting at the centers of pressure of each pad surface balance the friction-induced swinging moments acting on the surfaces, so that the inclination of each pad surfaces stabilizes at some point of equilibrium for each combination of pressure and friction forces.

Radial and thrust loadings of the bearing assembly will cause the bearing pad surfaces to find an inclined position of equilibrium that in all cases will enable generation of a load carrying lubricant wedge between the relatively moving surfaces of the assembly. Moment loads applied co or by member 16 about radially transverse axes will be resisted in a similar manner by the bearing assembly as the radial and thrust loads, since such moment loads can be broken down into their radial and thrust components, and reacted by the swing pad elements as such forces. Thrust loads will simply cause the movable pad faces to swing in a manner tending to equalize fluid film pressure along the bearing surfaces parallel to the axis of rotation.

Various other modifications to the specific embodiment disclosed are possible. Also it should be understood that the term "load applying or supporting member" is not an alternative expression, but a unitary term referring to member 16 or its equivalent. This term is used to signify that, in any application of the invention, member 16 could be rotated while member 18 is held against fixed rotation; member 16 could be fixed while member 18 and the bearing pads rotate about member 16 under load carrying conditions; or both members 16 and 18 could be rotating at different angular velocities or directions. In all cases, the load could come from the direction of the bearing pads or from the direction of member 16.

While member 18 is shown as a singular element supporting two sets of bearing pads 10 and 12, it could be divided along a radial plane and each half spaced along the longitudinal axis 14 in fixed relationship. Various other changes and modifications could be made without departing from the spirit and scope of the invention, which is intended to be limited solely by the claims appended hereto.

What is claimed is:

1. A fluid film bearing assembly comprising:
   (a) at least two cylindrically arranged groups of bearing pads disposed about a longitudinal axis of rotation, one group being longitudinally spaced along said axis with respect to the other group;
   (b) pad support areas located beneath each pad;
   (c) the bearing pads each comprising:
      (i) a face portion having a curved bearing surface facing generally towards said axis, and a spherically curved rear surface facing a concentric surface of a respective bearing support area, the concentric surfaces defining interface surfaces having a center of curvature located between said axis and said bearing surface;
      (ii) alternate layers of laminated elastomer-inelastic material between and coextensive with the interface surfaces, the material being bonded to the interface surfaces and being compliant in directions along the interface surfaces but rigid in a radial sense with respect thereto, so that the face portion is supported upon and secured to a respective pad support area by said material in a manner that positively restricts the freedom of motion of said face portion to swinging movement relative to the pad support area in a plurality of directions about a swing center corresponding to said center of curvature during bearing operation, and said material provides an elastic restoring force that resists such swinging movement; and
   (d) said bearing surfaces having concave curvatures that are symmetrically and uniformly disposed about said longitudinal axis, the bearing surfaces of each group of bearing pads being inclined relative to said axis in opposite directions so that they face away from one another along said axis.

2. The bearing assembly according to claim 1, wherein the centers of curvature of the said interface surfaces are equidistant from said longitudinal axis.

3. The bearing assembly according to claim 1, wherein said bearing surfaces of each group of bearing pads are spherically curved about common centers of curvature that are located on and axially spaced along said longitudinal axis.

4. The bearing assembly according to claim 3, wherein said center of curvature lies along a radius line extending from the said common center of curvature to the approximate center of each bearing surface when said face portion is in its rest position.

5. The bearing assembly according to claim 3, including a load applying or supporting member extending along said longitudinal axis and within said cylindrical group of bearing pads, said load applying or supporting member having continuous peripheral bearing surfaces that are spherically curved about said common centers of curvature of said bearing surfaces of said bearing pads, the continuous bearing surface of said load applying or supporting member being adjacent to the bearing surfaces of the bearing pads, and said group of bearing pads and said load applying or supporting member being rotatable relative to each other about said longitudinal axis.

6. The bearing assembly according to claim 1, wherein each bearing surface is a conical segment.

7. The bearing assembly according to claim 6, wherein said center of curvature lies along a radius line extending normal to the approximate center of the bearing surface area when the respective face portion is at rest.

8. The bearing assembly according to claim 1, including a load applying or supporting member extending along said longitudinal axis and within said cylindrical group of bearing pads, said load applying or supporting member having continuous peripheral bearing surfaces that are curved to conform to the curvature of the bearing surfaces of the bearing pads, said continuous bearing surfaces of the load applying or supporting member being adjacent to the bearing surfaces of the bearing pads, said group of bearing pads and said load applying or supporting member being rotatable relative to each other about said longitudinal axis.

9. The bearing assembly according to claim 8, wherein the adjacent bearing surfaces are conically curved.

10. The bearing assembly according to claim 8, including a fluid lubricant about the adjacent bearing surfaces, whereby friction forces generated by the relative motion between said load applying or supporting member and the bearing pads cause the face portions of the bearing pads to swing to inclined positions creating wedge-shaped lubricant films between the bearing surfaces, the wedge films converging in the direction of motion of the continuous bearing surfaces relative to the face portions of the bearing pads.

* * * * *